Dec. 23, 1930. C. C. SUNDERLAND 1,786,138
WIRE TESTING MACHINE
Filed Sept. 17, 1928
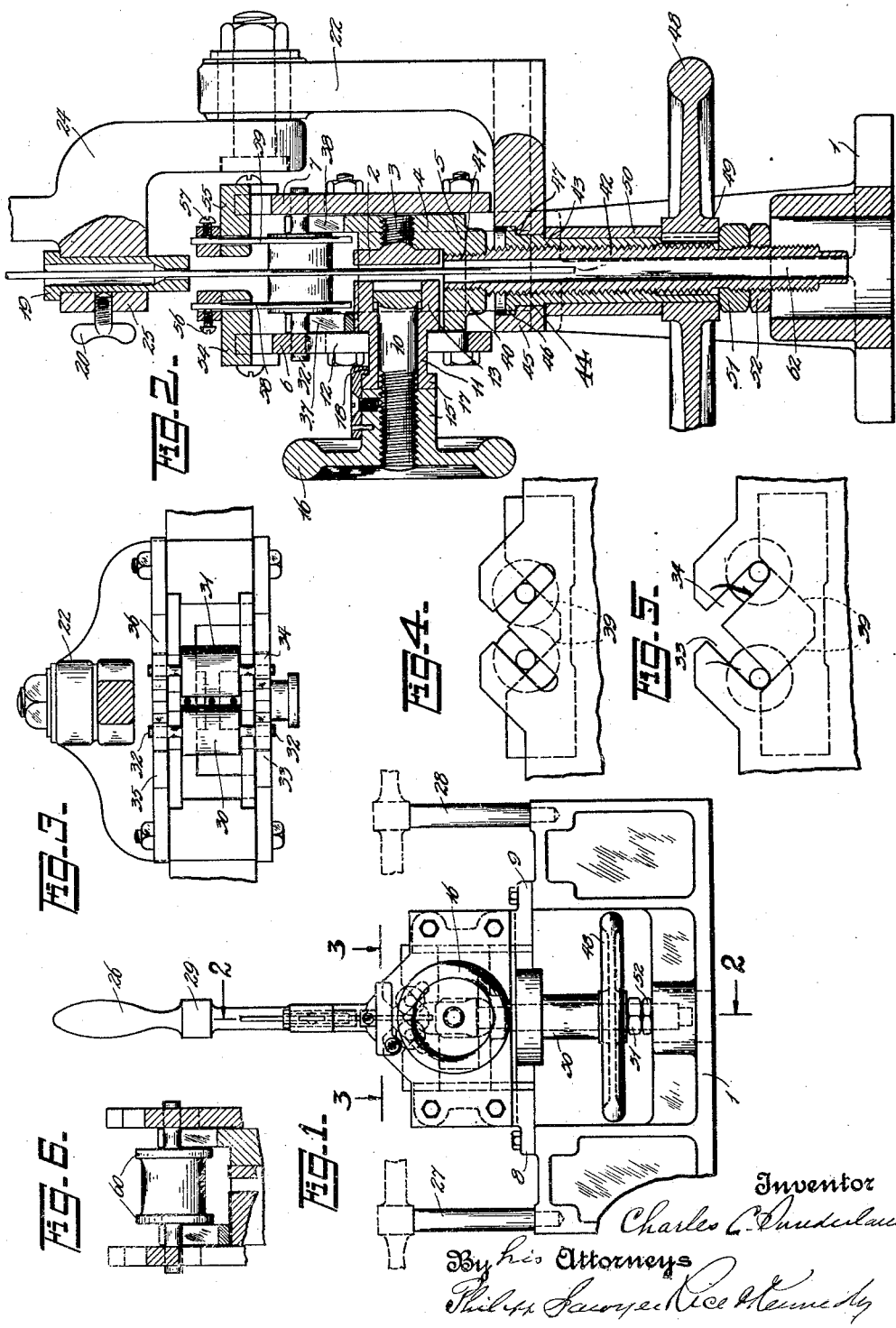

Patented Dec. 23, 1930

1,786,138

UNITED STATES PATENT OFFICE

CHARLES C. SUNDERLAND, OF TRENTON, NEW JERSEY, ASSIGNOR TO JOHN A. ROEBLING'S SONS COMPANY, OF TRENTON, NEW JERSEY, A CORPORATION OF NEW JERSEY

WIRE-TESTING MACHINE

Application filed September 17, 1928. Serial No. 306,525.

This invention relates to bending test machines and more particularly to bending test machines for testing wire-like specimens.

Generally speaking, bending test machines of the type for use in testing wire-like specimens usually comprise oppositely located holding devices between which the specimen to be tested is held, one of the devices being movable with respect to the other so as to produce a bend or flexure of the specimen.

In order that the bending characteristics be accurately determined, the bending of the specimen should take place at approximately the same point at each bend, and, to this end, bending mandrels are provided over which the object or specimen is flexed, one for each direction of bend. These mandrels are usually provided with curved surfaces and are located along the object, at the point of bend between the clamping members. When bending is to take place in more than one direction and additional mandrels are provided, care must be taken that the flexure for each direction of bend takes place about the same point. The bending mandrels, therefore, should be as nearly as possible of the same curvature and dimensions and be accurately centered about the specimen.

The mandrels heretofore known, generally comprised rectangular blocks having formed on one side curved surfaces over which the specimen is bent. Experience has shown that it is very difficult with such mandrels to line them up centrally of the object. This is especially true where it is desired to make comparative tests of a number of specimens, since any small variation in mandrel surface or position seriously affects the result. It is furthermore extremely difficult to form identical bending surfaces on a number of mandrels when it is desired to employ more than one mandrel.

It is an object of the present invention, therefore, to provide bending test machines in which the bending mandrels are of such construction that they may be readily formed accurately to the proper curvature and be dimensioned accurately to within very close limits.

It is a further object of the invention to provide means whereby the mandrels may be adjustably positioned and accurately centered for various sized specimens.

With these general objects in view, the invention consists in various features of construction and combinations of parts which will first be described in connection with the accompanying drawings and then more particularly pointed out in the claims.

In the drawings:

Figure 1 is a view in front elevation of a test machine embodying the invention to its best advantage;

Figure 2 is a sectional view enlarged, taken on the line 2—2 of Fig. 1;

Figure 3 is a plan view, partly broken away and partly in section, of the machine looking in the direction of the arrows 3—3 of Fig. 1;

Figures 4 and 5 are diagrammatic views showing the mandrels in different positions; and Figure 6 is a view of a modified form of mandrel.

Referring to these drawings, the bending test machine, in the embodiment shown, comprises a base 1 on which is carried a holding device. While the latter may vary in construction, it may conveniently comprise, as shown, a clamping surface 2 having a screw threaded shank 3 taking into an upright portion 4 of a supporting or setting block 5 which is adapted for free movement between two upstanding plates 6, 7 bolted to uprights 8, 9, bolted on the frame 1. Cooperating with clamping surface 2 for gripping a specimen for test is a movable clamping member which may take the form of a stud 10 extending freely through a bored thrust block 11 which fits into a slot-like opening 12 cut in plate 6. The block 11 is formed with an enlarged head 13, wider than opening 12, to take the thrust produced by stud 10 as later described.

Means are provided for tightening and relieving the grip of said clamping members 2 and 10 on the specimen under test. This may be accomplished conveniently by screw operated means. To this end, the clamping stud 10 is screw-threaded on its outer end to receive a nut 15, which may be turned by a wheel 16 conveniently formed integral therewith. In order to effect longitudinal movement of the stud 10 through the block 11 upon rotation of the nut 15, the block 11 is provided at its outer end with a flange 17 against which the nut 15 bears. To this end suitably secured to the handle 16 is an offset finger 18 which takes behind the flange 17, thus holding the surface of the nut against the end surface of the block. Therefore, upon turning the nut 15 in one direction, the stud 10 moves towards the surface 2 to grip the specimen and, upon turning the nut 15 in the other direction, the stud 10 moves away from the surface 2 to release the specimen.

Suitable means is provided for bending the object under test. Although capable of various constructions, in that here shown as an example, pivotally mounted on the upstanding lug 22 of supporting base 1 is a lever 24 provided with an angled extension 25 within which is held, as by thumb screw 20, a flanged tubular bushing 19 through which the object under test extends and which acts in the nature of a guide therefor when bending. For imparting a swinging motion to the lever and consequently to the guiding device, there is provided a handle 26 which may conveniently be formed integral with the lever 24.

In order to limit the travel of the lever 24 when bending the specimen under test, stop means may be provided. To this end the base member 1 has formed thereon upstanding side members 27, 28 located on either side thereof and in the path of the swinging handle 26, the latter being provided with a double surfaced enlarged portion 29 for abutting these stops.

The invention contemplates the provision of mandrels which may be accurately formed and positioned. This may be accomplished by making the mandrel of such a form that every point on the bending surface thereof shall be equidistant from its axis with the result that the bending radii for the whole surface may be the same. Although capable of various constructions, as here shown as an example, the mandrels may comprise cylinders and in the now considered preferred form, these cylinders are rectangular cylinders of revolution. It is apparent that these cylinders may be readily turned or ground down on a lathe to any desired size within an accuracy of a few thousandths of an inch. Furthermore, being symmetrical, they present identical bending surfaces to the specimen regardless of their longitudinal position, and, when rotatably mounted, wear by constant use of the same portions of the surface is avoided.

Means are provided for mounting the cylinders 30, 31 so that they may be capable of being accurately centered about the specimen in all positions and readily adjusted for accommodating specimens of varying widths or diameters. In structures now preferred this will be effected by supporting the mandrels freely on their axes. Although capable of various constructions, as here shown, the two cylindrical mandrels 30, 31 are provided with axially extending trunnions 32, one on either end. These trunnions take bearing in upwardly inclined slots 33, 34 and 35, 36, formed in supporting plates 6, 7, respectively. The slots in each plate converge toward each other so that, as the cylinders are moved upwardly, they also approach each other for positioning the specimen between them. By cutting the slots in each plate at equal angles, the mandrels are centered about the specimen. With such an arrangement, the mandrels may readily be positioned adjacent specimens of different diameters.

Means is provided for adjustably positioning the cylinders in the slots to accommodate specimens of different thickness. In structures embodying the invention to what is now considered its best advantage, this may be accomplished by imparting to the cylinders a compound movement. To this end, setting block 5, which, it will be remembered, is located within the upstanding members 6, 7, is provided with upper side walls 37, 38 having downwardly inclined mutually approaching surfaces 39, on which the trunnions 32 bear. For convenience of construction, side wall 37 may be formed, as shown, separably from the block 5, which is so formed as to allow the cylinders 30, 31 freedom of movement within it. Thus, as the side walls 37, 38 are moved relatively to the slots, the cylinders move both vertically and horizontally, i. e. with a compound movement.

There is provided means for raising and lowering the block 5 to position the cylinders 30, 31 in the slots. Although capable of various constructions, as here shown as an example, the bottom portion 40 of block 5 is centrally bored, and secured therein, as by a screw threaded shank 41, is one end of a stud 42, the other end of which is threaded through a bushing 43. The latter extends through an opening 44 in a boss 45 formed on the base 1, being held in the opening by means of a flange 46 which rests upon a shoulder or ledge 47 formed within the opening 44.

The stud 42, and as a consequence block 5, may be raised or lowered by means of an adjusting wheel 48 the hub 49 of which is keyed to the lower end of the bushing 43 for turning therewith. The bushing 43 and wheel 48 are held against vertical movement by a sleeve 50 embracing the bushing and bearing at its upper end against the under side of boss 45 and at its lower end against the hub 49 of wheel 48, and by the flange 46 and shoulder 47.

For permitting the testing of long specimens, for example, the stud 42 is centrally bored as at 62 so that the end of the specimen may be passed therethrough.

To guard against too great pressure being exerted when positioning the mandrels against the specimen, there is provided spacing means between them. Although capable of various constructions in one form shown as an example the spacing means may conveniently be formed from stock similar to the specimen under test. To this end, carried on the upper part of supporting plates 6, 7 are inwardly extending clamping members 54, 55 in which are held as by screws 56, 57, sections of wire 58, 59. These sections 58, 59 are suspended between the mandrel surfaces, one on either end, and limit the approach of the mandrels toward each other. Spacers of various diameter may readily be inserted in the clamping members 54, 55 to accommodate specimens of various sizes on the same mandrels.

In the modification shown in Figure 6 the cylinders are formed with end flanges 60 which are adapted to abut against each other for limiting the mandrel approach.

The operation of this device is as follows:

Wheel 48 is turned in a direction to lower setting block 5 until the mandrels are in the position indicated in Figure 5. A specimen to be placed under test, for example, a wire, is then passed through the guiding member 19, between the mandrels 30, 31 and through the bore 62 of stud 42. The lower end of the specimen is then clamped between anvil 2 and stud 10 by means of wheel 16 above described. The mandrels 30, 31 are now brought into position against the wire by turning the wheel 48 to raise the block 5, carrying the trunnions 32 along the inclined slots (Fig. 4) until the mandrels exert a light pressure on the specimen. The position of the mandrels is then located for subsequent specimens of the same size by means of nut 51, which is turned up on the lower end of stud 42 until it abuts the hub 49 of wheel 48, whereupon it is locked in place by lock nut 52. The wire is now flexed about the mandrels 30, 31, first in one direction and then in the other by swinging the handle 26 to move the bending lever 24—stops 27, 28 limiting the bend in both directions.

In order to remove the specimen after test, it is only necessary to reverse the direction of turning of the wheel 48, whereupon the block 5 is lowered, opening the mandrels, after which the stud 10 may be backed off by reversely turning wheel 16, releasing the specimen.

When a series of tests are to be made on the same sized wire and the setting of the mandrels is to remain unchanged, the block 5 is lowered to separate the mandrels, a new specimen is inserted in the machine as above described, and then it is only necessary to raise the block 5 by turning wheel 48 until nut 51, previously locked on stud 42, is raised to contact with the hub of wheel 48. The mandrels, therefore, always occupy the same relative position with respect to the specimens, as fixed by the position of nut 51. The setting of nut 51 will differ for specimens of different sizes.

It is evident that the mandrels may be replaced by other mandrels of different diameters, so that comparative tests may be conducted on various sized specimens.

With the construction described, specimens of wire and similar objects may be accurately, easily and quickly tested for bending, the bends occurring at the same point.

While the invention has been illustrated in a construction embodying all its features in the form now preferred by me, it will be understood that the invention is not limited to the specific constructions or arrangement of parts shown, but that many modifications other than that here shown may be made by those skilled in the art, while retaining the invention defined by the claims.

What is claimed is:

1. In a bending test machine and in combination, means for holding a specimen for test, means for bending said specimen, a bending mandrel, trunnions therefor, mounting members for said trunnions having inclined slots and means for adjusting said trunnions in said slots.

2. In a bending test machine and in combination, means for holding a specimen for test, means for bending said specimen, a cylindrical bending mandrel, adjustable mounting means for said mandrel comprising cooperating, oppositely inclined surfaces, and means for moving said surfaces relatively to each other for positioning said mandrel.

3. In a bending test machine and in combination, means for holding a specimen for test, means for bending said specimen, cylindrical bending mandrels and means for adjustably positioning said mandrels with respect to said specimen.

4. In a bending test machine and in combination, means for holding a specimen for test, guide means for said specimen, means for causing relative movement between said holding and guide means for bending a specimen, cylindrical bending mandrels between said holding and guide means and means for centering said mandrels with respect to a specimen, said means comprising trunnions on said mandrels, supports for said mandrels having inclined surfaces on which said trunnions bear, cooperating supporting surfaces for said trunnions, and means for positioning said last mentioned surfaces along said inclined surfaces.

5. In a bending test machine and in combination, means for holding a specimen for test, means for bending said specimen, a bending mandrel, means for positioning said mandrel with respect to said specimen, and means for limiting the movement of said positioning means.

6. In a bending test machine, and in combination, a pair of cylindrical mandrels, means for adjusting said mandrels toward and from each other, and spacers for limiting the movement of the bending surfaces toward each other.

7. In a bending test machine, and in combination, a pair of cylindrical mandrels, means for adjusting said mandrels toward and from each other, and means for removably holding spacers of different sizes for limiting the movement of the bending surfaces toward each other.

8. In a bending test machine and in combination, means for holding a specimen for test, means for bending said specimen, a pair of cylindrical mandrels intermediate said holding and bending means, and trunnions for rotatably mounting said mandrels.

In testimony whereof, I have hereunto set my hand.

CHARLES C. SUNDERLAND.